United States Patent
Sakamoto et al.

(10) Patent No.: US 11,676,277 B2
(45) Date of Patent: Jun. 13, 2023

(54) MEDICAL IMAGE PROCESSING APPARATUS AND METHOD

(71) Applicant: CANON KABUSHIKI KAISHA, Tokyo (JP)

(72) Inventors: Ryo Sakamoto, Kyoto (JP); Koji Sakai, Kyoto (JP); Gakuto Aoyama, Kyoto (JP); Kiyohide Satoh, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 72 days.

(21) Appl. No.: 17/501,477

(22) Filed: Oct. 14, 2021

(65) Prior Publication Data

US 2022/0036557 A1 Feb. 3, 2022

Related U.S. Application Data

(60) Division of application No. 16/588,015, filed on Sep. 30, 2019, now Pat. No. 11,176,671, which is a
(Continued)

(30) Foreign Application Priority Data

Oct. 1, 2014 (JP) .............................. JP2014-203344

(51) Int. Cl.
*G06T 7/00* (2017.01)
*G06T 7/246* (2017.01)

(52) U.S. Cl.
CPC ............ *G06T 7/0016* (2013.01); *G06T 7/246* (2017.01); *G06T 2207/10076* (2013.01);
(Continued)

(58) Field of Classification Search
CPC ................... G06T 7/0016; G06T 7/246; G06T 2207/10076; G06T 2207/10081;
(Continued)

(56) References Cited

U.S. PATENT DOCUMENTS 9,123,096 B2 9/2015 Miyasa et al.
9,480,456 B2 11/2016 Endo et al.
(Continued)

FOREIGN PATENT DOCUMENTS

EP 1 208 796 A1 5/2002
JP H08-297733 A 11/1996
(Continued)

OTHER PUBLICATIONS

McClelland et al., "A continuous 4D motion model from multiple respiratory cycles for use in lung radiotherapy", Med. Phys. 33 „9 . . . , Sep. 2006 (Year: 2006).*
(Continued)

*Primary Examiner* — Qian Yang
(74) *Attorney, Agent, or Firm* — Venable LLP

(57) ABSTRACT

From a plurality of medical images in time phases, a target site is extracted from at least one medical image, a reference point is set on each of a target-site side, and a periphery side of the target site which are on across from each other over an outline of the extracted target site, and movement information for the reference points is calculated.

4 Claims, 9 Drawing Sheets

Related U.S. Application Data continuation of application No. 15/514,140, filed as application No. PCT/JP2015/004581 on Sep. 9, 2015, now Pat. No. 10,475,184.

(52) U.S. Cl.
CPC ............... *G06T 2207/10081* (2013.01); *G06T 2207/10088* (2013.01); *G06T 2207/10104* (2013.01); *G06T 2207/20072* (2013.01); *G06T 2207/30061* (2013.01); *G06T 2207/30096* (2013.01)

(58) Field of Classification Search
CPC . G06T 2207/10088; G06T 2207/10104; G06T 2207/20072; G06T 2207/30061; G06T 2207/30096
See application file for complete search history.

(56) References Cited

U.S. PATENT DOCUMENTS

| | | | |
|---|---|---|---|
| 9,558,549 B2 | 1/2017 | Ishikawa et al. | |
| 2002/0115923 A1* | 8/2002 | Erbel | A61B 6/541 600/407 |
| 2010/0074490 A1* | 3/2010 | Arakita | G06T 7/20 382/128 |
| 2010/0215225 A1* | 8/2010 | Kadomura | G06T 7/62 382/128 |
| 2011/0262015 A1 | 10/2011 | Ishikawa et al. | |
| 2012/0250966 A1 | 10/2012 | Fujisawa et al. | |
| 2013/0051646 A1 | 2/2013 | Nakano et al. | |
| 2013/0195339 A1 | 8/2013 | Endo et al. | |
| 2015/0254852 A1 | 9/2015 | Yamato et al. | |
| 2016/0117797 A1* | 4/2016 | Li | G06T 3/0081 382/128 |
| 2016/0307292 A1 | 10/2016 | Endo et al. | |
| 2016/0310036 A1 | 10/2016 | Endo et al. | |
| 2016/0314582 A1 | 10/2016 | Endo et al. | |
| 2017/0243348 A1 | 8/2017 | Sakamoto et al. | |

FOREIGN PATENT DOCUMENTS

| | | |
|---|---|---|
| JP | 2008-079792 A | 4/2008 |
| JP | 2012-213604 A | 11/2012 |

OTHER PUBLICATIONS

Amelon et al. "A Measure for Characterizing Sliding on Lung Boundaries", Annals of Biomedical Engineering, vol. 42, No. 3, Mar. 2014, pp. 642-650 (Year: 2014).*

Delmon et al., "Registration of sliding objects using direction dependent B-splines decomposition", Phys. Med. Biol. 58 (2013) 1303-1314 (Year: 2013).*

Xie, et al., "Deformable Image Registration of Liver with Consideration of Lung Sliding Motion", Medical Physics, vol. 38, No. 10 (2011) 5351-61.

* cited by examiner

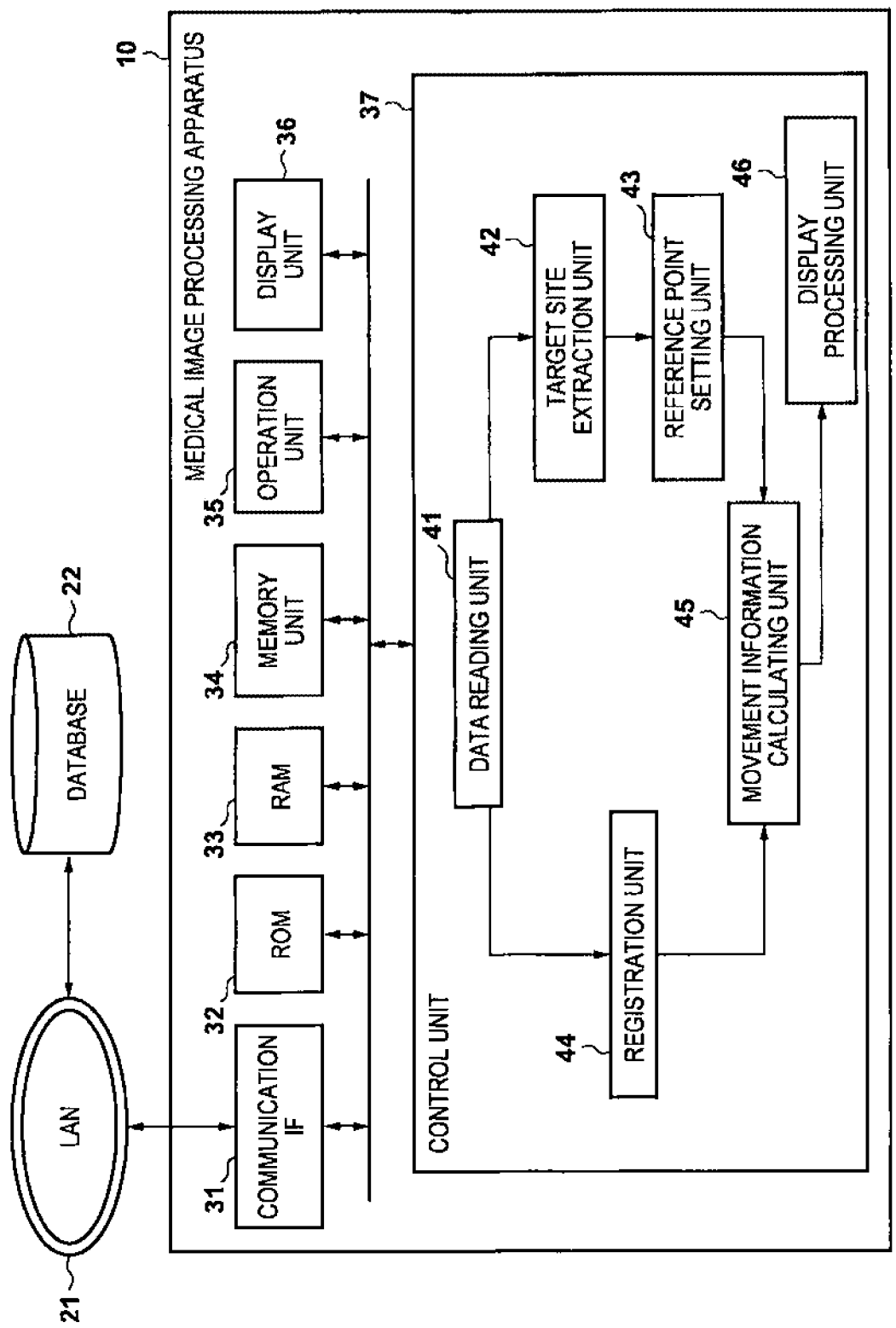
[Fig. 1]

[Fig. 2]
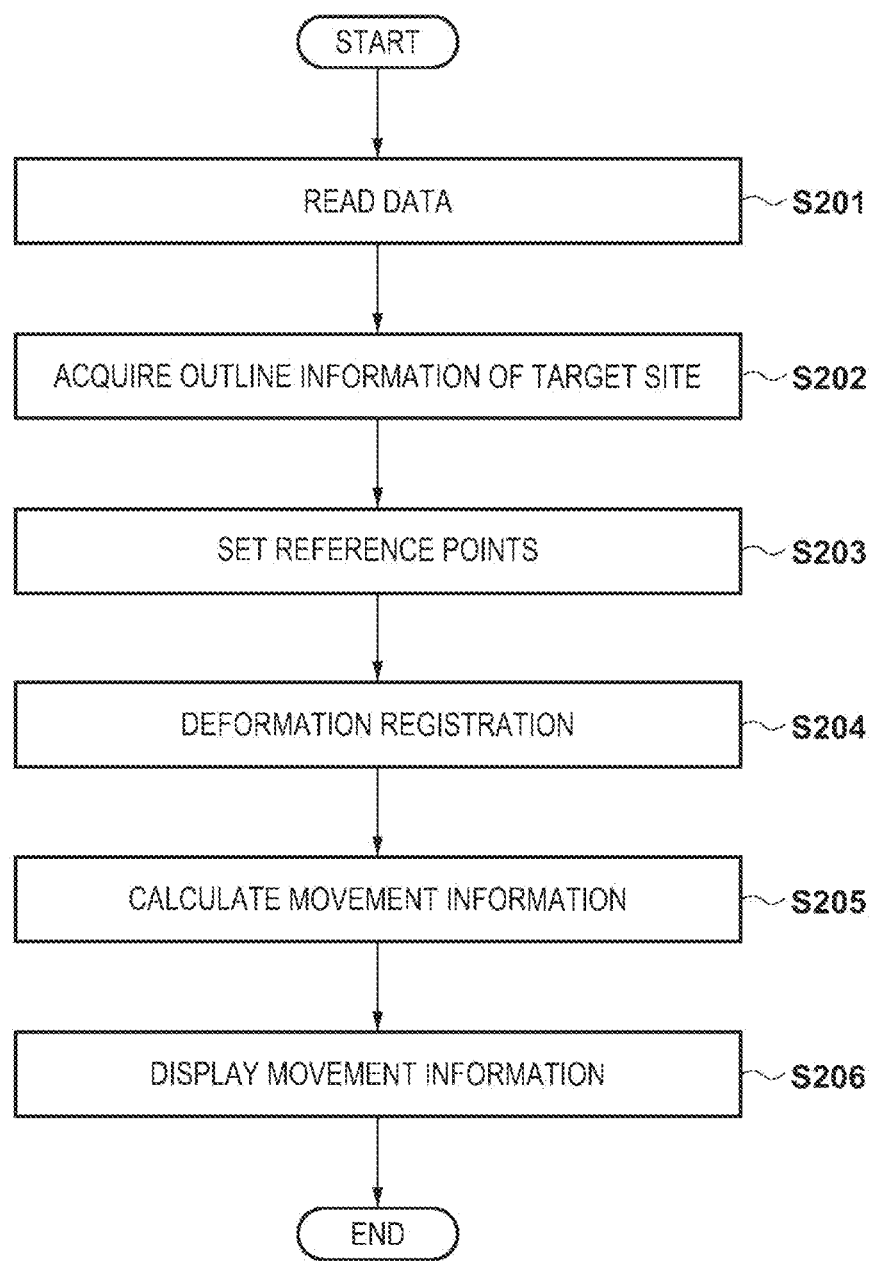

[Fig. 3A]
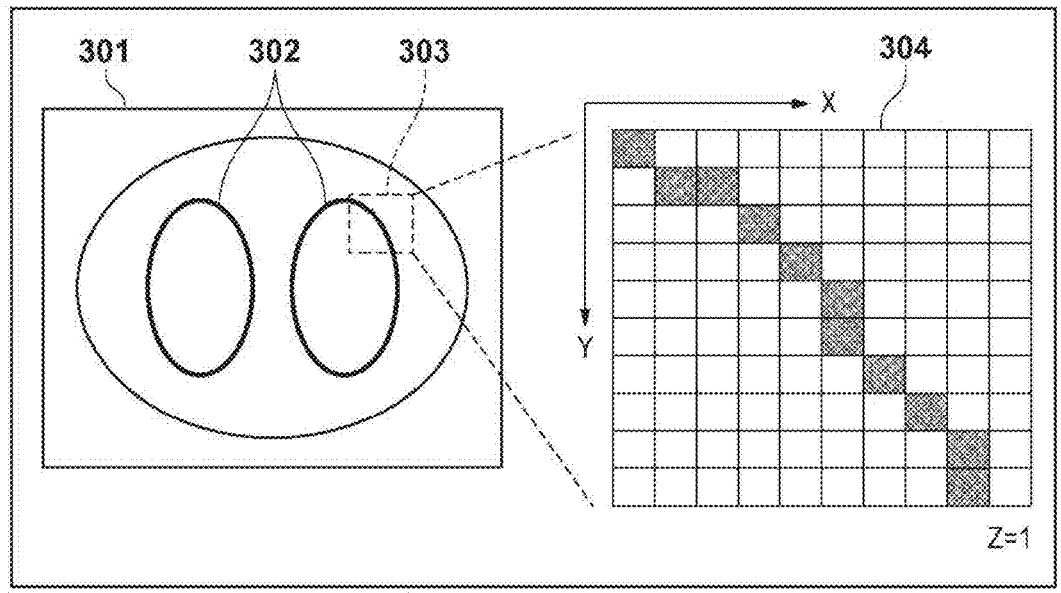
[Fig. 3B]
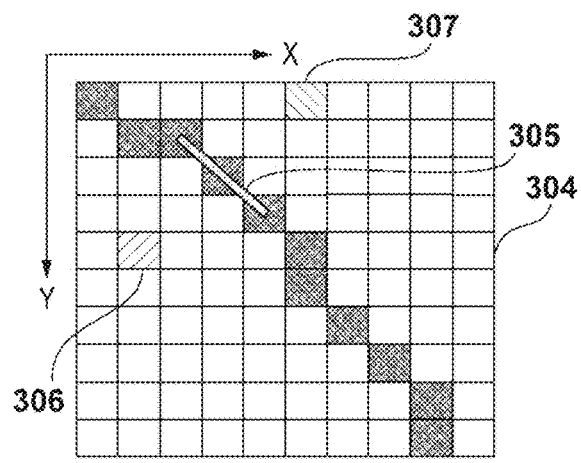
[Fig. 3C]
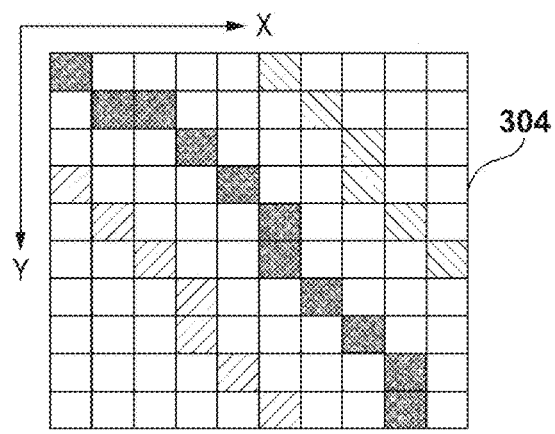

[Fig. 4A]
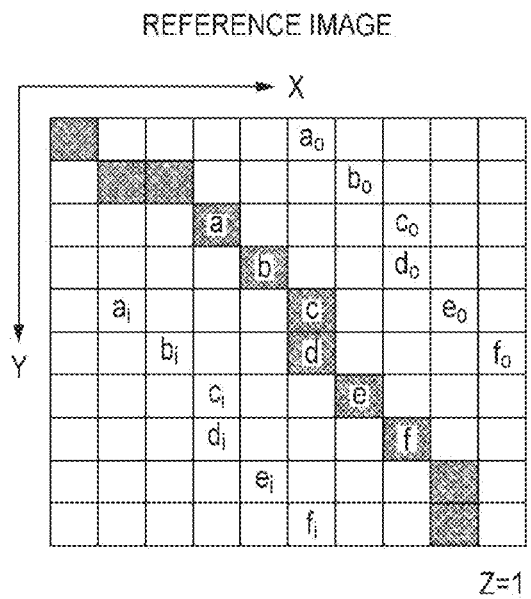
[Fig. 4B]
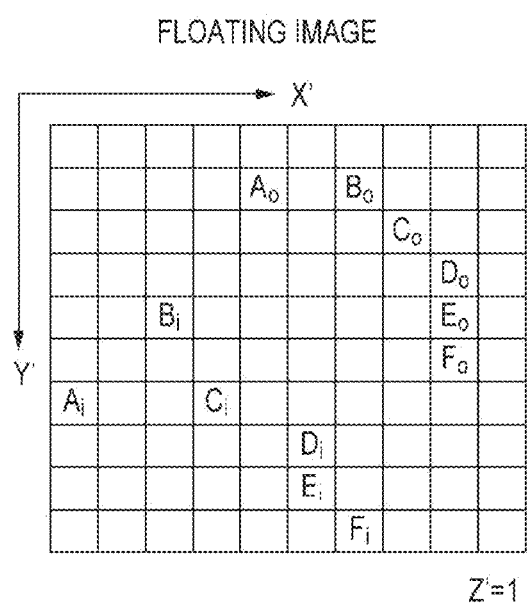

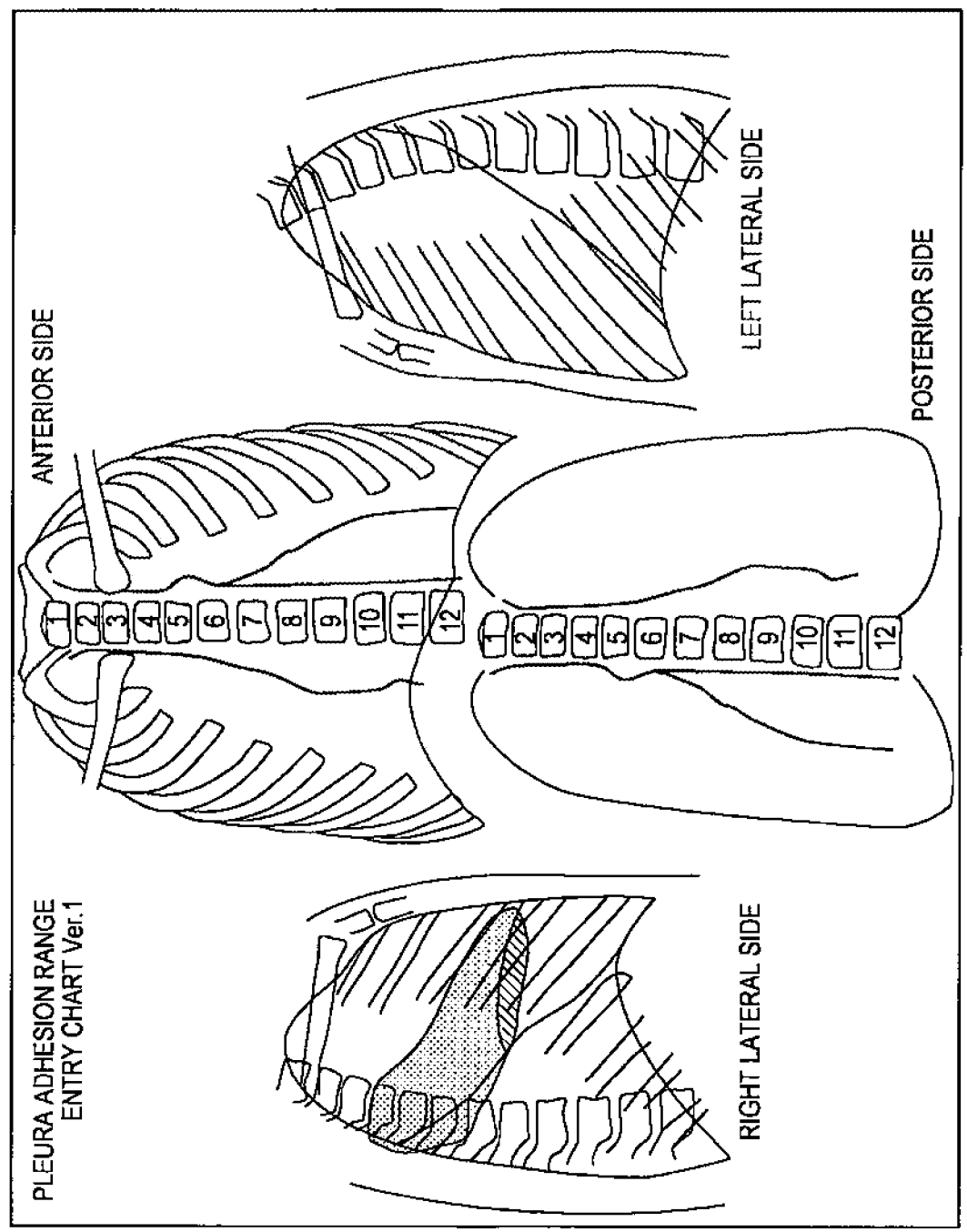
[Fig. 5]

[Fig. 6A]
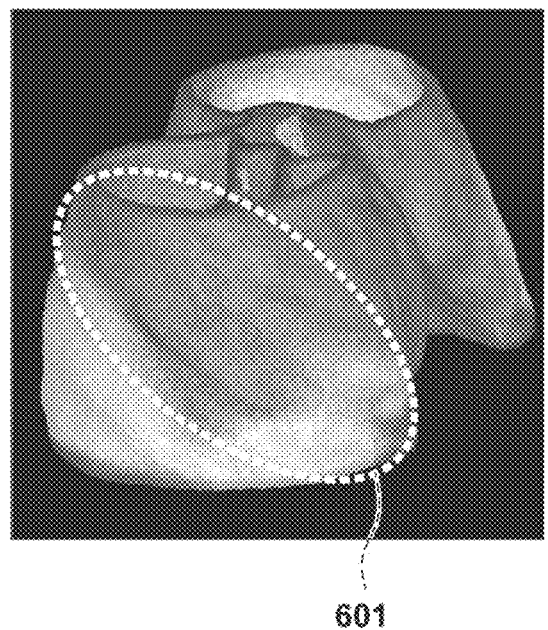
[Fig. 6B]
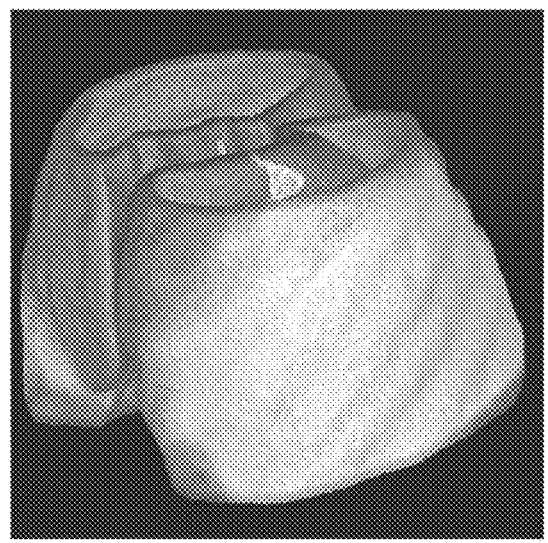

[Fig. 7A]
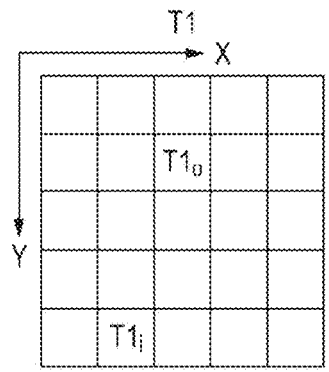
[Fig. 7B]
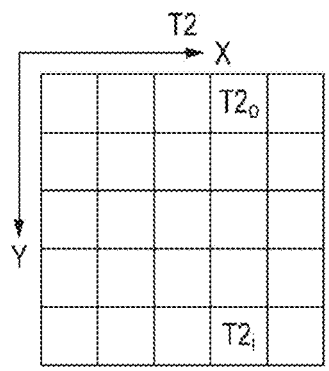
[Fig. 7C]
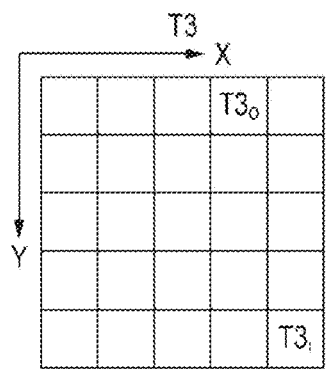
[Fig. 7D]
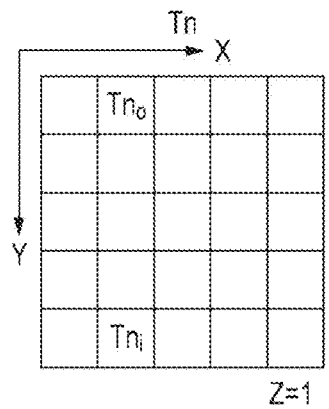

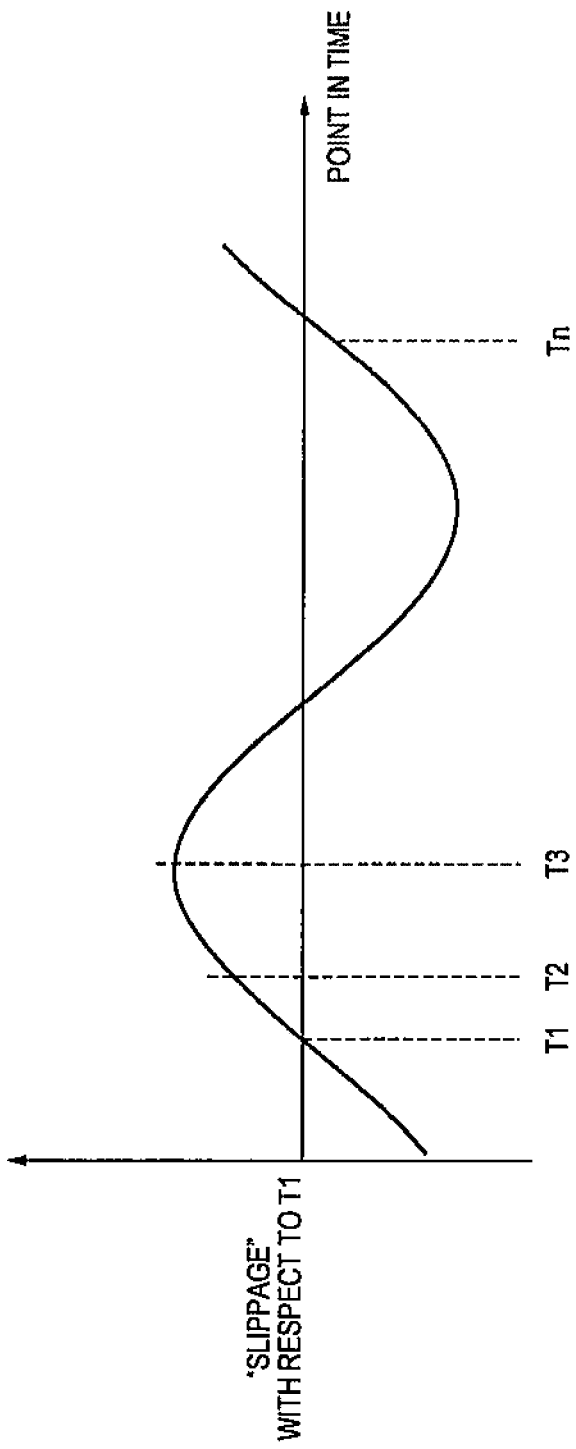
[Fig. 8]

[Fig. 9A]
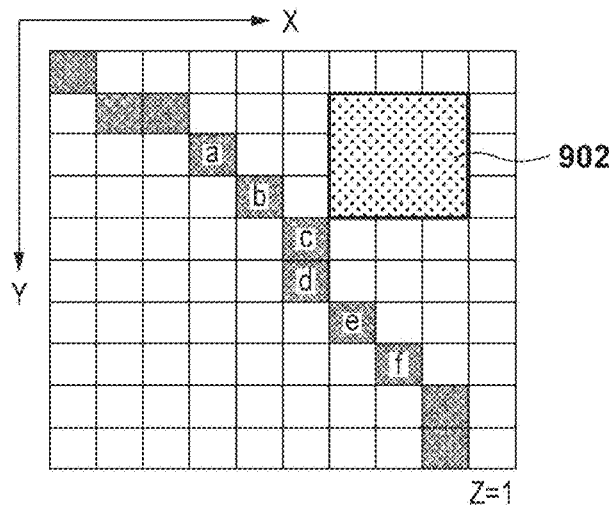
[Fig. 9B]
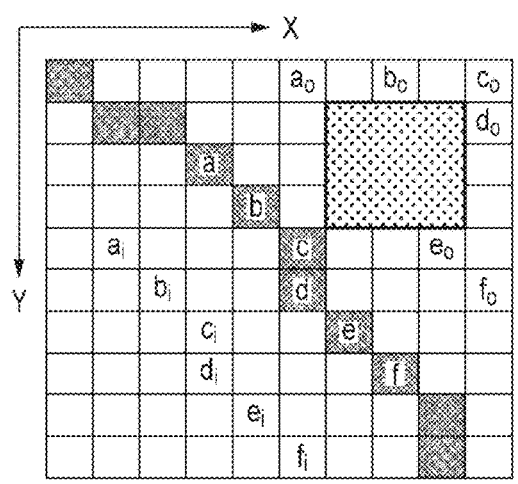
[Fig. 10]
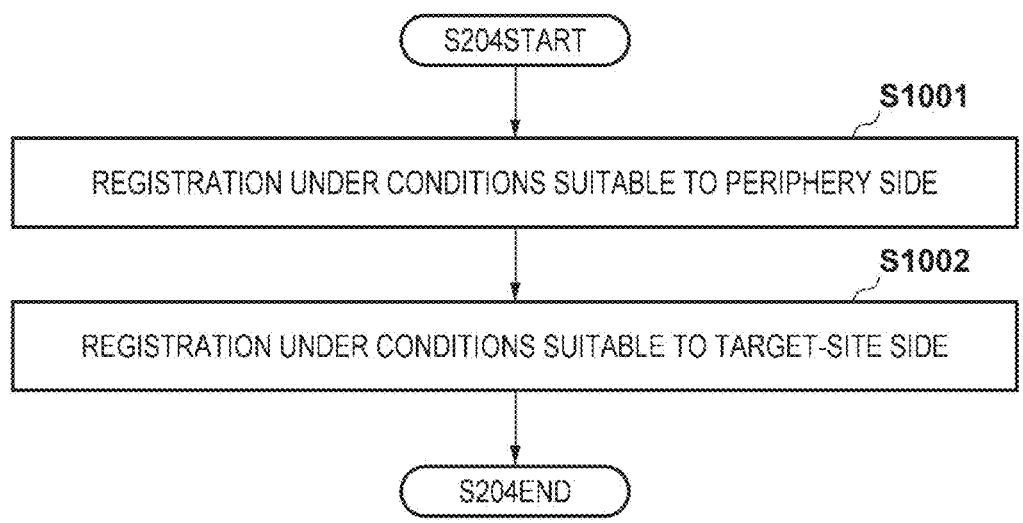

MEDICAL IMAGE PROCESSING APPARATUS AND METHOD

TECHNICAL FIELD

The present invention relates to a medical image processing technique.

BACKGROUND ART

At a medical site, an image of a patient is captured by a medical imaging apparatus such as an X-ray CT (Computed Tomography) apparatus, an MRI (Magnetic Resonance Imaging) apparatus, or a PET (Position Emission Tomography) apparatus. By viewing the captured medical image in detail, an anatomical structure of various types of target sites (organs) in the body of the patient and functional information therefor are obtained, and the information is used in diagnosis and treatment.

Within the various types of target sites that comprise in a human body, there is a type of organ that moves with respect to target sites in the periphery thereof. For example, the lungs move in accordance with respiratory movement, and the heart moves to cause the circulation of blood in a body. Even for the same target site, it is known that due to its structure or the presence/absence of a lesion, movement (a direction of a movement or an amount of a movement) relative to the periphery differs depending on a position in the target site or on its surface (hereinafter, referred to as a position-within-target-site).

There is a demand from users (a doctor or the like) to be able to recognize a position-within-target-site having an abnormal movement to discover a lesion, by visualizing, from medical images, differences in the direction of a movement at the position-within-target-site that is made to be a target, or in the amount of the movement (hereinafter, referred to as movement information). For example, there is a demand to be able to specify an adhesion position in a surface of a lung from medical images by visualizing differences in movement information according to respiratory movement of a lung, with respect to differences in position on the surface of the lung. In Japanese Patent Laid-Open No. 2012-213604, a technique of specifying a lesion portion from a medical image, and calculating a level of infiltration to the periphery of the lesion portion from relative movement information of the lesion portion and peripheral portions thereof is disclosed.

However, in the technique recited in Japanese Patent Laid-Open No. 2012-213604, it is not possible to visualize a difference in movement information in a difference in position in the lesion portion. In other words, even if this is applied, replacing the lesion portion recited in Japanese Patent Laid-Open No. 2012-213604 with a target site, it is not possible to visualize differences in movement information in differences in position-within-target-site for the target site, and the user is not able to recognize a position-within-target-site that has abnormal movement information in the target site.

SUMMARY OF INVENTION

The present invention was conceived in view of these kinds of problems, and provides a technique for calculating information indicating a relative movement amount with respect to the periphery in each position-within-target-site of a target site, associating it with each position-within-target-site of the target site and then presenting the information.

According to a first aspect of the present invention, there is provided a medical image processing apparatus comprising:

acquisition means for acquiring a plurality of medical images in time phases;

extraction means for extracting a target site from at least one medical image from the plurality of medical images;

setting means for setting a reference point on each of a target-site side, and a periphery side of the target site which are on across from each other over an outline of the target site extracted by the extraction means; and calculation means for calculating movement information for the reference points set by the setting means.

According to a second aspect of the present invention, there is provided a medical image processing apparatus comprising:

acquisition means for acquiring plural pieces of medical image data in time phases;

extraction means for extracting a target site with respect to at least one piece of the plural pieces of medical image data acquired in accordance with the acquisition means;

setting means for respectively setting a reference point on an outline of the target site extracted by the extraction means, and setting a reference point on either a target-site side or a periphery side of the target site; and movement information calculation means for calculating movement information for the reference points set by the setting means.

According to a third aspect of the present invention, there is provided a medical image processing method comprising:

an acquisition step for acquiring a plurality of medical images in time phases; an extraction step for extracting a target site from at least one medical image from the plurality of medical images;

a setting step for setting a reference point on each of a target-site side, and a periphery side of the target site which are across from each other over an outline of the target site extracted in the extraction step; and a calculation step for calculating movement information for the reference points set in the setting step.

According to a fourth aspect of the present invention, there is provided a medical image processing method comprising:

an acquisition step for acquiring plural pieces of medical image data in time phases;

an extraction step for extracting a target site with respect to at least one piece of the plural pieces of medical image data acquired in accordance with the acquisition step;

a setting step for respectively setting a reference point on an outline of the target site extracted in the extraction step, and setting a reference point on either a target-site side or a periphery side of the target site; and a movement information calculation step for calculating movement information for the reference points set in the setting step.

According to a fifth aspect of the present invention, there is provided a computer program for causing a computer to function as:

acquisition means for acquiring a plurality of medical images in time phases; extraction means for extracting a target site from at least one medical image from the plurality of medical images;

setting means for setting a reference point on each of a target-site side, and a periphery side of the target site which are on across from each other over an outline of the target site extracted by the extraction means; and calculation means for calculating movement information for the reference points set by the setting means.

Further features of the present invention will become apparent from the following description of exemplary embodiments (with reference to the attached drawings).

BRIEF DESCRIPTION OF DRAWINGS

FIG. 1 is a block diagram for illustrating an example configuration of a medical image processing system.

FIG. 2 is a flowchart of processing that a medical image processing apparatus 10 performs.

FIG. 3A is a view explaining a reference point setting method according to a reference point setting unit 43.

FIG. 3B is a view explaining a reference point setting method according to a reference point setting unit 43.

FIG. 3C is a view explaining a reference point setting method according to a reference point setting unit 43.

FIG. 4A is a view explaining processing in step S205.

FIG. 4B is a view explaining processing in step S205.

FIG. 5 is a view explaining a test result.

FIG. 6A is a view in which a method of a first embodiment has been used on a pre-operation X-ray 4D-CT image to visualize a slippage.

FIG. 6B is a view in which a method of a first embodiment has been used on a pre-operation X-ray 4D-CT image to visualize a slippage.

FIG. 7A is a view explaining a first variation.

FIG. 7B is a view explaining a first variation.

FIG. 7C is a view explaining a first variation.

FIG. 7D is a view explaining a first variation.

FIG. 8 is a view explaining the first variation.

FIG. 9A is a view explaining the reference point setting method in a fourth variation.

FIG. 9B is a view explaining the reference point setting method in a fourth variation.

FIG. 10 is a flowchart showing details of processing in step S204.

DESCRIPTION OF EMBODIMENTS

Embodiments of the present invention will be described hereinafter in detail, with reference to the accompanying drawings. Note that embodiments described below merely illustrate examples of specifically implementing the present invention, and are only specific embodiments of a configuration defined in the scope of the claims.

First Embodiment

A medical image processing apparatus according to the present embodiment calculates a "slippage" representing to what degree a region in a medical image slips with respect to a peripheral region, for each position-within-target-site (a position on a surface of a target site or a position in the target site) in a target site (organ). The position-within-target-site and the "slippage" calculated for the position-within-target-site are then associated and displayed. Here, the "slippage" is a relative movement amount with respect to a target periphery. For example, due to respiratory movement of a lung, the surface of the lung (also called visceral pleura) moves so as to slip with respect to its periphery (also called parietal pleura). In such a case, the medical image processing apparatus according to the present embodiment associates and displays a surface position of the lung and a "slippage" in the surface position. For such display, if there is adhesion between the surface of the lung and the periphery thereof (also called pleural cavity), at a surface position for which adhesion is present, less "slippage" is displayed in comparison to the periphery.

Firstly, a block diagram of FIG. 1 is used to explain an example configuration of a medical image processing system that includes a medical image processing apparatus according to the present embodiment. Note that, as will be explained later, a configuration shown in FIG. 1 is merely one example of a configuration of a medical image processing system to which the present embodiment is applicable, and any configuration may be used if the configuration can realize processing explained below.

As shown in FIG. 1, the medical image processing system according to the present embodiment has a medical image processing apparatus 10 and a database 22, and the medical image processing apparatus 10 and the database 22 are connected to a LAN (Local Area Network) 21. Note that while the medical image processing apparatus 10 and the database 22 may be connected so that communication is possible therebetween; the connection configuration between the medical image processing apparatus 10 and the database 22 is not limited to the LAN 21.

Firstly explanation is given for the database 22. Stored in the database 22 is medical image data for various sites of various patients, various pieces of information corresponding to the medical image data (an imaging target site, an image capturing condition, information corresponding to a patient, or the like), or the like. The medical image data includes a plurality of slice images (medical images) of a site that is an imaging target. By accessing the database 22 via the LAN 21, the medical image processing apparatus 10 can read the medical image data saved in the database 22 or various information corresponding to the medical image data. Note that the database 22 may be a memory apparatus in the medical image processing apparatus 10, without being an apparatus separate to the medical image processing apparatus 10.

Next, explanation is given for the medical image processing apparatus 10.

A communication IF (Interface) 31 is realized by a LAN card or the like, and controls data communication between an external apparatus (for example, the database 22) and the medical image processing apparatus 10 via the LAN 21.

A ROM (Read Only Memory) 32 is realized by non-volatile memory or the like, and, for example, stores setting data or a boot program for the medical image processing apparatus 10, or the like.

A RAM (Random Access Memory) 33 is realized by volatile memory or the like, and, for example, has an area for storing a computer program or data loaded from a memory unit 34, or data read from the database 22 via the communication IF 31. Furthermore, a RAM 33 has a work area used when a control unit 37 executes processing. In this way the RAM 33 can appropriately provide various areas.

The memory unit 34 is a large capacity information storage device realized by an HDD (Hard Disk Drive) or the like. Saved in the memory unit 34, for example, is an OS (operating system), computer programs for causing the control unit 37 to execute or control various processing described later as something the medical image processing apparatus 10 performs, data, or the like. In addition, saved in the memory unit 34 is information handled as information known beforehand in the following explanation. The computer programs, data, or the like saved in the memory unit 34 are loaded into the RAM 33 as appropriate in accordance with control by the control unit 37, and become a target of processing by the control unit 37.

An operation unit 35 is realized by a user interface such as a keyboard or a mouse, and by a user of the medical image processing apparatus 10 operating the operation unit 35, various instructions can be input to the control unit 37.

A display unit 36 is realized by a CRT, a liquid crystal screen, or the like, and can display a result of processing by the control unit 37 through images, text, or the like to thereby enable provision of various information to a user (for example, a doctor).

The control unit 37 is realized by a CPU (Central Processing Unit) or the like. By using a computer program, data or the like stored in the RAM 33 to execute processing, the control unit 37 performs operation control of the medical image processing apparatus 10 on the whole, and also executes or controls various later-described processing as something that the medical image processing apparatus 10 performs.

The control unit 37 has, as a functional configuration thereof, a data reading unit 41, a target site extraction unit 42, a reference point setting unit 43, a registration unit 44, a movement information calculating unit 45, and a display processing unit 46. There are cases below in which explanation is given of a functional unit as a subject of processing, but this means that a function of that functional unit is caused to be realized by the control unit 37 executing a computer program corresponding to the functional unit out of computer programs stored in the RAM 33. However, one or more of these functional units may be realized by using dedicated hardware, and software and/or hardware may used in any way to realize these functional units.

The data reading unit 41 accesses the database 22 via the communication IF 31 or the LAN 21. The data reading unit 41 then reads from the database 22 at least two pieces of medical image data (for example, X-ray CT image data captured at times different to each other (X-ray CT image data for different time phases)), which become targets for registration. The data reading unit 41 then sends the read medical image data to the target site extraction unit 42 and the registration unit 44. Note that below, medical image data that becomes a reference for registration is referred to as a reference image, and medical image data for which registration is performed with respect to this reference image is referred to as a floating image.

The target site extraction unit 42 performs processing, which is described later, with respect to at least one piece of the medical image data sent from the data reading unit 41 (for example, the reference image) to thereby acquire outline information, which is information for defining an outline of the target site. The outline information may be any information if it is information that can define the outline of the target site on a respective slice image included in the medical image data, but hereinafter, the outline information is information that defines a pixel position (coordinates) for each pixel that configures the outline. However, the outline information may be any information that simply indicates the pixel position of each pixel that configures the outline, and, for example, may be an equation that represents the outline. The target site extraction unit 42 then sends the acquired outline information to the reference point setting unit 43.

By using the outline information acquired by the target site extraction unit 42 to execute processing which is described later, the reference point setting unit 43 sets reference points for each of a target-site side (an organ side) and a target site periphery side (a periphery side that faces the organ side) which are across from each other over the outline of the target site. The reference point setting unit 43 then sends information indicating a position for each set reference point to the movement information calculating unit 45.

By performing a known deformation registration of one piece of medical image data of the two pieces of medical image data sent from the data reading unit 41 with respect to the other piece of the medical image data, the registration unit 44 calculates pixel positions in the other piece of medical image data that correspond to respective pixels in the one piece of medical image data. The registration unit 44 then sends information indicating the pixel positions in the other piece of medical image data that correspond to the respective pixels in the one piece of medical image data, i.e. information indicating a pixel position correspondence relationship between the pieces of medical image data, as corresponding pixel position information, to the movement information calculating unit 45. According to this embodiment, pixel positions (coordinates) for pixels in the floating image that correspond to pixels that comprise the reference image are corresponding pixel position information.

The movement information calculating unit 45 uses "information indicating a position of each reference point" sent from the reference point setting unit 43 and the "corresponding pixel position information" sent from the registration unit 44 to execute later described processing, and thereby calculates a "slippage" (a movement amount relative to a periphery) for each pixel (an outline configuration point) that comprises the outline of the target site. The movement information calculating unit 45 then sends the slippage obtained for each outline configuration point to the display processing unit 46.

The display processing unit 46 displays the "slippage" for each outline configuration point calculated by the movement information calculating unit 45 on the display unit 36. Various display forms can be considered for a display form of the "slippage" for each outline configuration point. For example, for one or more slice images included in medical image data, displaying is performed after luminance values of outline configuration points in the slice images are converted to a grayscale value or a color scale value in accordance with the slippage obtained for the outline configuration points.

Note that, a portion of the above-described functional units explained as a functional configuration of the control unit 37 may be assigned to an external apparatus (for example, a server apparatus via a network, such as a cloud server) separate to the medical image processing apparatus 10. In such a case, the medical image processing apparatus 10 advances processing while performing data communication with the external apparatus.

Next, FIGS. 2 to 4A, 4B are used to give an explanation regarding operation of the medical image processing apparatus 10. Hereinafter, explanation is given for a case in which the data reading unit 41 reads from the database 22 two pieces of medical image data acquired after capturing a chest region for a single patient at two points in time at which inhalation amounts differ by using an X-ray CT apparatus. The target site extraction unit 42 then sets the target site (organ) for which to extract the outline as a lung, and calculates the "slippage" (slippage of pleura) in relation to the periphery (can also be called parietal pleura) of positions on the surface of the lung (can also be called visceral pleura). However, that each process described below is not limited to these examples is clear from the following explanation, if one is skilled in the art.

\<Step S201\>

The data reading unit 41 accesses the database 22 via the communication IF 31 and the LAN 21, and as described above, reads "two pieces of medical image data acquired after capturing a chest region for a single patient at two points in time at which inhalation amounts differ by using an X-ray CT apparatus" from the database 22.

Note that the two pieces of medical image data acquired after capturing at two points in time at which inhalation amounts differ are, for example, image data that is for two points in time that are temporally different and is acquired by using a conventional X-ray 4D-CT apparatus to perform capturing without specifying a respiratory condition for a patient (without breath holding). The two pieces of medical image data acquired by capturing at two points in time for at which inhalation amounts differ may be two pieces of CT image data captured in a state in which the patient has fully exhaled a breath (exhalation state), and a state in which the breath is fully inhaled (inhalation state).

\<Step S202\>

In step S201, the target site extraction unit 42 extracts a region in a lung field, by a method below, from one of the two pieces of medical image data read by the data reading unit 41 (a reference image), and then acquires outline information of the extracted region (outline information for the lung field).

The target site extraction unit 42 first uses a smoothing filter to perform noise reduction on the reference image (in other words, each slice image included in the one piece of medical image data of the two pieces of medical image data read by the data reading unit 41 in step S201). The target site extraction unit 42 then uses a predetermined threshold (for example, −200 HU) to perform binary conversion processing on the reference image on which noise reduction has been performed, to thereby separate regions in the reference image into an inside-body region and an outside-body region. The target site extraction unit 42 then uses a different threshold (for example, −500 HU) on the inside-body region in the reference image to separate the inside-body region into a region in the lung field and another region, and to obtain a pixel position for each pixel that configures an outline (a boundary of the region in the lung field and the other region) of the region in the lung field According to this type of processing, it is possible to obtain the pixel position for each pixel that configures the outline of the target site in the reference image, i.e. the outline information.

Note that in the target site extraction processing, it is sufficient that a region determined from the reference image can be extracted, and limitation is not made to the present approach. For example, conventional segmentation processing, such as graph cut processing, may be used to extract the target site. Alternatively, not shown diagram drawing software may be used to render the outline for the target site manually by a user, and extract the outline information from the rendered outline. Alternatively, after the target site is automatically extracted by a conventional approach (the above-described binary conversion processing, segmentation processing, or the like), the outline information may be extracted after an automatically extracted outline is corrected manually by a user.

\<Step S203\>

The reference point setting unit 43 uses the outline information acquired by the target site extraction unit 42 to execute the processing explained below and thereby set reference points for each of a target-site side and a target site periphery side which are across from each other over the outline of the target site in the reference image. In other words, the reference point setting unit 43 sets a first reference point for the target-site side, sets a second reference point for the periphery side that opposes the target-site side from across the outline, and furthermore sets a plurality of first reference point and second reference point pairs. In the following processing, movement information for the second reference points is calculated with respect to the first reference points. FIGS. 3A to 3C are used to give an explanation regarding the reference point setting method by the reference point setting unit 43. Note that in FIGS. 3A to 3C in order to simplify the explanation only a partial region in the reference image is shown, and below such FIGS. 3A to 3C are used to explain a method of setting reference points in the partial region. However, actually similar processing is performed with regards to all regions of the reference image.

In FIG. 3A, the reference number 301 is an axial plane chest CT image in a specific slice position (Z=1), and the reference number 302 denotes outlines of regions in a lung field acquired from a chest CT image 301 in step S202. The reference number 304 denotes a pixel group in a region 303 shown by broken lines in the chest CT image 301. Boxes filled in black in the pixel group 304 represent pixels that configure the outline 302 in the region 303 (outline configuration points), and boxes filled in white represent pixels that configure a region other than the outline 302 in the region 303.

Here, setting a position of an upper left corner of the pixel group 304 as an origin, if the rightward direction is taken as the X axis and the downward direction is taken as the Y axis, it is possible to express a pixel position for each pixel that comprises the pixel group 304 in an XYZ coordinate system. In other words, the pixel positions (coordinates) for the pixels that comprise the outline 302 become (1,1,1), (2,2,1), (3,2,1), (4,3,1), (5,4,1), (6,5,1), (6,6,1), (7,7,1), (8,8,1), (9,9,1), (9,10,1).

Here reference points are set in pairs of the target-site side (in the lung field) and the periphery side (outside the lung field) for all the outline configuration points. For example, reference points corresponding to an outline configuration point are set at positions separated by a fixed distance along a normal direction towards each of the target-site side and the periphery side from the center of a line segment connecting two outline configuration points that are adjacent to the outline configuration point (that sandwich the outline configuration point). In the case of FIGS. 3A to 3C, when setting reference points corresponding to the outline configuration point at coordinates (4,3,1), firstly a line segment (reference numeral 305 of FIG. 3B) that connects the coordinates (3,2,1) and coordinates (5,4,1), the two outline configuration points that are adjacent to the outline configuration point, is set. Then a reference point is set at each of a position separated a fixed distance along the normal direction from the center of the line segment 305 to the target-site side, and a position separated a fixed distance along the normal direction from the center of the line segment 305 to the periphery side. In the present example, the "fixed distance" is "two pixels". In FIG. 3B, a pixel 306 and a pixel 307 (in other words a pixel at coordinates (2,5,1) and a pixel at coordinates (6,1,1)) shown with diagonal lines are set as reference points. The pixel 306 is a reference point for the target-site side, and the pixel 307 is a reference point for the periphery side. FIG. 3C shows a reference point group (the group of boxes shown with diagonal lines) set for all the outline configuration points in the pixel group 304. Note that FIG. 3C shows an example in which reference points corresponding to each outline configuration point included in the pixel group 304 are included in the pixel group 304, but in accordance with the value of the above described "fixed distance" or a distribution of the outline configuration points, there are cases in which a reference point is set outside of the pixel group 304.

Note that if the reference points are set as a pair for the target-site side and the periphery side, for each of the outline configuration points, the reference points may be set at any position. For example, they may be set on straight lines extended along the normal directions of the line segment that connects the two outline configuration points adjacent to the focus outline configuration point so as to pass through the focus outline configuration point at positions that are a fixed distance from the focus outline configuration point. Also, in accordance with an orientation of the line segment connecting two outline configuration points that are adjacent to an outline configuration point, the distance by which they are separated from the line segment may be changed.

Also, reference points may be set both on the outline of the target site, and on either the target-site side or the periphery side of the target site with reference to the outline. In other words, a reference point of either the target-site side or the periphery side may be the corresponding outline configuration point itself. In other words, reference points may be set on the outline and on the target-site side (or on the periphery side of the target site).

Specifically, the reference point setting unit 43 uses the outline information acquired by the target site extraction unit 42 to set a reference point on each of on the outline of the target site, and either the target-site side and the periphery side of the target site, based on the outline. The reference point setting unit 43 then sends information indicating a position for each set reference point to the movement information calculating unit 45.

The movement information calculating unit 45 uses the "information indicating the position of each reference point" sent from the reference point setting unit 43 and the "corresponding pixel position information" sent from the registration unit 44 to calculate the movement information for the reference points of the outline and the reference points set in the target-site side (or in the periphery side of the target site). In other words, the "slippage" (a movement amount relative to the periphery) in each pixel (outline configuration point) that configures the outline of the target site organ is calculated. Thereby, it is possible to calculate the slippage for the target site with regard to the periphery of the target site, based on the movement information for the reference points. Setting of the reference points, as shown in FIGS. 3A to 3C, may be implemented in each slice for the reference image after setting two-dimensional coordinates therein, or three-dimensional coordinates may be set for three-dimensional volume data. Furthermore, the reference points may be set for all outline configuration points that configure the outline acquired in step S202 as in the present embodiment, or may be set only for outline configuration points at fixed intervals. In addition, setting may be performed with respect to only positions on the outline that a user designates.

<Step S204>

Towards one (the reference image) of the two pieces of medical image data that the data reading unit 41 read in step S201, the registration unit 44 performs deformation registration of the other piece (the floating image). For the deformation registration, conventional deformation registration processing, such as an FFD (Free-Form Deformation) method or an LDDMM (Large Deformation Diffeomorphic Metric Mapping) method, is applicable. Any of such deformation registration maintains a normal structure of the target site in the medical image data.

By such processing, it is possible to calculate (acquire corresponding pixel position information) the pixel positions on the floating image that correspond to each pixel in the reference image. Here, if a difference in inhalation amount for each of the reference image and the floating image is small, non-linear deformation registration processing as initially exemplified above may be performed, but if the difference in inhalation amount is large, deformation registration processing may fail. In such a case, non-linear deformation registration processing may be performed after performing known linear deformation registration processing, such as an affine transformation, before performing non-linear deformation registration processing.

Here, the processing of step S204 may be performed at any time if it is performed after step S201 and before step S205. For example, the processing of step S204 may be performed before step S202, and may be performed between step S202 and step S203. Furthermore, the processing of step S204 may be performed in parallel with step S202 and step S203.

<Step S205>

When performing registration between medical images (between pieces of medical image data) for different time phases, the movement information calculating unit 45 calculates movement information for the reference points set on the periphery side with respect to the reference points set on the target-site side, between the medical image for which the reference points are set and the medical image that is registered with respect to the medical image for which the reference points are set. In other words, the reference points set in step S203 and the corresponding pixel position information acquired in step S204 are used to calculate the "slippage" in each outline configuration point. The "slippage" is an amount that the outline configuration point has moved with respect to the periphery. FIGS. 4A and 4B are used to specifically explain processing in step S205.

FIG. 4A shows a pixel group in a partial region of the reference image, in which boxes filled in black, including boxes a-f, indicate outline configuration points (pixels), and boxes filled in white indicate non-outline configuration points (pixels). In addition, the pixel position for each of the outline configuration points and the non-outline configuration points is shown in an XYZ coordinate system. In addition, $a_i$-$f_i$ each indicate a target-site side reference point corresponding to the outline configuration points a-f, and $a_o$-$f_o$ each indicate a periphery side reference point corresponding to the outline configuration points a-f.

FIG. 4B shows a pixel group in a partial region in the floating image, and the pixel position for each pixel in the pixel group is shown in an X'Y'Z' coordinate system. $A_i$-$F_i$ respectively indicate pixels defined as pixels that correspond to $a_i$-$f_i$ by the corresponding pixel position information, and $A_o$-$F_o$ respectively indicate pixels defined as pixels that correspond to $a_o$-$f_o$ by the corresponding pixel position information.

Here, coordinates for a target-site side reference point in the reference image at an outline configuration point P are set as $(x_i, y_i, z_i)$, and coordinates for a pixel on the floating image corresponding to the reference point are set as $(x_i', y_i', z_i')$. Here, coordinates for a periphery side reference point in the reference image at an outline configuration point P are set as $(x_o, y_o, z_o)$, and coordinates for a pixel on the floating image corresponding to the reference point are set as $(x_o', y_o', z_o')$. At this point, a "slippage" S (movement information) at the outline configuration point P can be calculated through the following equation.

$$S=\sqrt{((x_i-x_i')-(x_o-x_o'))^2+((y_i-y_i')-(y_o-y_o'))^2+((z_i-z_i')-(z_o-z_o'))^2}$$

For example, if coordinates for $a_i$ (2,5,1), coordinates for $A_i$ (1,7,1), coordinates for $a_o$ (6,1,1) and coordinates for $A_o$ (5,2,1) are used to calculate the above-described equation, the "slippage" S is $\sqrt{((2-1)-(6-5))^2+((5-7)-(1-2))^2+((1-1)-(1-1))^2}$, which when calculated gives S=1. As another example, if coordinates for $c_i$ (4,7,1), coordinates for $c_i$ (4,7,1), coordinates for $c_o$ (8,3,1) and coordinates for $c_o$ (8,3,1) are used to calculate the above-described formula, the "slippage" S is 0.

In this way, for each outline configuration point on the outline, the "slippage" is calculated based on the difference between the pixel positions of the reference points set for the outline configuration points, and the pixel positions of the points defined by the corresponding pixel position information as points on the floating image that correspond to the reference points. Note that if in step S203 reference points are only set for a portion of outline configuration points from outline configuration point group, the "slippage" is only calculated for the outline configuration points for which reference points are set.

<Step S206>

The display processing unit 46 visualizes and displays on the display unit 36 the slippage. In other words, as described above, the display processing unit 46 displays the "slippage" for each outline configuration point calculated by the movement information calculating unit 45 on the display unit 36. Here, in a case where luminance for outline configuration points in the medical image data is converted to a grayscale value or a color scale value in accordance with the slippage obtained for the outline configuration points, the color scale or grayscale may be predetermined, or may be changed dynamically. For example, the width of the grayscale and the median value thereof may be determined from a minimum value and a maximum value from the respective slippages calculated in step S205. Note that the visualization method for the "slippage"s described here is merely an example, and the visualization method is not limited to this if a position-within-target-site of the target site and the "slippage" at its position can be displayed in association. In addition, the luminances of the outline configuration points in a portion of the slice images, rather than all the slice images included in the medical image data, may be converted to grayscale values or color scale values in accordance with the slippages obtained for those outline configuration points, and these may be displayed. This "a portion of the slice images" may be slice images selected by a user operating the operation unit 35, or may be slice images selected by the control unit 37 on the basis of some criteria.

Next, a test result performed by using the approach in the present embodiment is discussed below. FIG. 5 is a view in which, for a patient having adhesion in a pleura, a mark is entered at a position at which a respiratory surgery department doctor could visually observe the adhesion when an open-chest operation is actually performed. According to FIG. 5, it is seen that the adhesion for this patient is in a wide range from the right side between the third-fifth ribs slightly towards a rearward direction. FIGS. 6A and 6B are views that visualize "slippage" using the approach in the present embodiment with respect to an X-ray 4D-CT image for the same patient as FIG. 5 before the operation. FIG. 6A is a view of a 3D image that visualizes the "slippage" in the present embodiment from the perspective of the right lateral side of the patient, and FIG. 6B is a view from the perspective of a left lateral side. In FIGS. 6A and 6B, the "slippage" is shown in a grayscale, and closer to white indicates a region for which the "slippage" is higher (more slippage), and closer to black indicates a region for which the "slippage" is lower (does not slip as much). Here, focusing on a region 601 of FIG. 6A, it is rendered as relatively black in comparison to the periphery thereof. This is more noticeable when compared to the same position of FIG. 6B, on the opposite side. Positions rendered as relatively black in the region 601 is substantially the same as the adhesion positions of the pleura shown in FIG. 5. Furthermore, when a respiratory surgery department doctor and a radiation department doctor who are medical specialists in interpretation confirm the images of FIGS. 6A and 6B, a conclusion that it is possible to visualize approximately the same region from an anatomical structure of the periphery was reached. From these results, it can be said that it is actually possible to visualize the adhesion position of the pleura in the approach in the present embodiment. Accordingly, because the position of adhesion is known from the imaged medical image data before the operation, there is the effect that it is possible to avoid unnecessary risk when performing an operation.

In this way, according to the present embodiment, because it is possible to visualize differences in "slippage" in differences in a position-within-target-site in the target site, a user can recognize the position-within-target-site that has "slippage" that is different to the periphery, and can recognize the existence/absence of an abnormality of a target site, a position of an abnormality, or the like.

(First Variation)

In step S201 of the first embodiment, two pieces of medical image data acquired after capturing at two point in times at which the inhalation amount is different are read. However, the number of pieces of the medical image data read in step S201 may be three or more. For example, configuration may be performed to use the X-ray 4D-CT apparatus in a state in which the patient does not stop respiration to read from the database 22 medical image data that is for many points in time and is captured at a specific interval. FIGS. 7A-7D, 8 are used to explain the medical image data for many points in time.

FIGS. 7A, 7B, 7C, 7D show slice images (medical images) (portion) in medical image data captured at points in time T1, T2, T3, and Tn (n is an integer greater than or equal to 4), respectively, and pixel positions in the medical image data are expressed by an XYZ coordinate system. In the present variation, as an example, T1 is the considered as a reference. In this case, extraction of the outline of the target site in step S202 or setting of the reference points in step S203 is performed with respect to the medical image data captured at the point in time T1. However, a point in time other than T1 may be the reference.

In FIG. 7A T1$i$ is a reference point (the coordinates thereof are (2,5,1)) of the target-site side corresponding to an outline configuration point (an outline configuration point Q), and T1$o$ is a reference point (the coordinates thereof are (3,2,1)) of the periphery side corresponding to the outline configuration point Q. In FIG. 7B T2$i$ and T2$o$ are corresponding points defined as points that correspond to T1$i$ and T1$o$, respectively, by corresponding pixel position information acquired by performing the above-described deformation registration on medical image data that includes the slice image of FIG. 7A as the reference image and medical image data that includes the slice image of FIG. 7B as the floating image. Coordinates of point T2$i$ are (4,5,1), and coordinates of point T2$o$ are (4,1,1). The slippage S of the outline configuration point Q, acquired by substituting coordinates of the reference points T1$i$ and T1$o$ and coordinates of T2$i$ and T2$o$ into the above-described equation, is "2".

In FIG. 7C, T3$i$ and T3$o$ are corresponding points defined as points that correspond to T1$i$ and T1$o$, respectively, by corresponding pixel position information acquired by performing the above-described deformation registration on medical image data that includes the slice image of FIG. 7A as the reference image and medical image data that includes the slice image of FIG. 7C as the floating image. Coordinates of point T3$i$ are (5,5,1), and coordinates of point T3$o$ are (4,1,1). Here, the slippage S of the outline configuration point Q, acquired by substituting coordinates of the reference points T1$i$ and T1$o$ and coordinates of T3$i$ and T3$o$ into the above-described equation, is "5".

In FIG. 7D Tn$i$ and Tn$o$ are corresponding points defined as points that correspond to T1$i$ and T1$o$, respectively, by corresponding pixel position information acquired by performing the above-described deformation registration on medical image data that includes the slice image of FIG. 7A as the reference image and medical image data that includes the slice image of FIG. 7D as the floating image. Coordinates of point Tn$i$ are (2,5,1), and coordinates of point Tn$o$ are (2,1,1). Here, the slippage S of the outline configuration point Q, acquired by substituting coordinates of the reference points T1$i$ and T1$o$ and coordinates of Tn$i$ and Tn$o$ into the above-described equation, is "2".

In this way, it is possible to calculate the "slippage" that uses T1 as a reference, based on the medical image data of each point in time. In the present variation, in step S205, for each outline configuration point, a portion or all of the "slippage" at each point in time obtained for the outline configuration point is used to calculate a "second slippage" for the outline configuration point. For example, an average value across all points in time of the "slippage"s of the respective point in time may be set as the "second slippage", or a maximum value of the "slippage" across all points in time may be set as the "second slippage". Here, because respiration is a periodic motion, the "slippage" for a reference point in time (T1 in the present example) in the respective points in time also changes periodically as in FIG. 8. In other words, if the number of pieces of data read is greater than or equal to a constant, it is possible to obtain a periodic function for the "slippage" with respect to the reference point in time, as in FIG. 8. In this case, the amplitude or period of the periodic function is used to calculate the "second slippage".

Then in step S206 of the present variation, the display processing unit 46 performs processing similar to that of the first embodiment so as to visualize the "second slippage". In other words, luminances of outline configuration points in the medical image data are converted to grayscale values or color scale values in accordance with the "second slippage" obtained for the outline configuration points, and the post-conversion medical image data is displayed.

Note that the method of calculating the "second slippage" explained here is one example, and the method of calculating the "second slippage" is not limited to this if it can use the "slippage"s of a plurality of points of time to represent a relative movement amount with respect to the periphery of each position-within-target-site in the target site.

Note that, in addition to the present variation, variations and embodiments explained below are predominantly explained as by differences with the first embodiment, and unless particularly touched upon are similar to the first embodiment.

(Second Variation)

For the first embodiment, in step S204 two differing pieces of medical image data are used to perform deformation registration. However, medical image data for a plurality of points in time may be used to gradually perform registration of the reference image and the floating image, and to calculate the "slippage". FIGS. 7A-7D are used to explain the present variation.

Here the medical image data that includes the slice image shown in FIG. 7A is set as the reference image, and the medical image data that includes the slice image shown in FIG. 7D is set as the floating image. The medical image data that includes the slice image of FIG. 7A, the medical image data that includes the slice image of FIG. 7B, the medical image data that includes the slice image of FIG. 7C, and the medical image data that includes the slice image of FIG. 7D are captured in a temporal sequence in this order (in other words T1<T2<T3<Tn).

Firstly, the reference image and the medical image data of point in time T2 adjacent thereto (the medical image data that includes the slice image of FIG. 7B) are used to perform deformation registration (called deformation processing 1), and to calculate the points T2$i$ and T2$o$, on the medical image data that includes the slice image of FIG. 7B, corresponding to each of the reference points T1$i$ and T1$o$.

Next, the medical image data that includes the slice image of FIG. 7B, and the medical image data (the medical image data that includes the slice image of FIG. 7C) of a point in time that is a point in time adjacent thereto and that is a point in time (T3 in the case of FIGS. 7A-7D) closer to the point in time Tn are used to perform deformation registration. According to this deformation registration, points T3$i$ and T3$o$, on the medical image data of FIG. 7C, corresponding to each of the reference points T2$i$ and T2$o$ are calculated.

In this way similar processing is repeated, and medical image data of a point in time T(n−1), and medical image data of a point in time that is adjacent thereto and that is a point in time closer to the point in time Tn (in other words Tn) are used to perform deformation registration. According to this deformation registration, points Tn$i$ and Tn$o$, on the medical image data of point in time Tn, corresponding to the reference points T(n−1)$i$ and T(n−1)$o$, respectively, are calculated.

In this way, in a case where medical image data of a plurality of points in time is used to gradually perform deformation registration, the "slippage" is calculated by using a reference image which is the medical image data of the point in time T1, and the floating image which is the medical image data of the point in time Tn. If the above-described equation is calculated by using the coordinates of T1$i$ (2,5,1) and the coordinates of Tn$i$ (2,5,1) as well as the coordinates of T1$o$ (3,2,1) and the coordinates of Tn$o$ (2,1,1), 2 is calculated as the "slippage".

If a difference between medical image data of two points in time is large, deformation registration processing may fail. However, according to the present variation, even if a difference between the reference image and the floating image is large, the positions thereof are registered gradually, so there is the effect that it is possible to correctly perform registration.

(Third Variation)

In the first embodiment, in step S204 and step S205, the corresponding pixel position information is acquired from a result of deformation registration processing with respect to the reference image and the floating image, which have the same image condition. However, the deformation registration processing may be performed to acquire the corresponding pixel position information after changing the image condition of the reference image and the floating image in accordance with the position of a reference point. In other words, registration may be performed between medical images (medical image data) that are a target of registration, after correcting the medical images that are the target of registration in accordance with an image condition corresponding to a position at which a reference point is set. This image condition differs for a position of a reference point of the target-site side, and a position of a reference point of the periphery side of the target site. Below, as an example, explanation is given for a case in which the target site is a lung. In step S204, for a position of a point on the floating image corresponding to a reference point of the target-site side, density values of the reference image and the floating image are set to conditions suitable to observation of a lung field (for example, WL at −600, WW at 1500), deformation registration processing is performed, and acquisition is performed using the result thereof. In step S204, for a position of a point on the floating image corresponding to the reference point of the periphery side, density values of the reference image and the floating image are set to conditions suitable to observation of a mediastinum (for example, WL at 60, WW at 400), deformation registration processing is then performed, and acquisition is performed using the result thereof. Then in step S205, for each reference point, the corresponding pixel position information acquired under the suitable image condition is used to calculate the "slippage".

For regions in which anatomical characteristics of the target site are different as in the inside and outside of a lung, image characteristics of the medical image data also differs. If deformation registration processing is performed collectively for such regions having differing medical image data image characteristics, there may be a failure. According to the present variation, suitable image conditions are used for each of regions in which characteristics of the medical image data differ to perform the deformation registration processing. Thereby, it is possible to perform correct deformation registration processing with respect to each region. Accordingly, there is the effect that even if reference points are set with respect to regions for which characteristics of the medical image data differs, it is possible to calculate the corresponding pixel position information correctly with respect to each reference point.

(Fourth Variation)

In the first embodiment, in step S203, reference points for an outline configuration point are set at positions separated by a fixed distance along normal directions from the center of a line segment connecting two outline configuration points adjacent to the outline configuration point. However, the setting method of the reference points is not limited to this. For example, an anatomical structure in the medical image data may be used to intentionally set a region (hereinafter referred to as an exclusion region) in which reference points are not set. For example, a bone region, a blood vessel region, or the like may be set as an exclusion region. Hereinafter, the exclusion region, which is a region in which reference points are not set, is acquired from the medical image (medical image data), and the reference points are set outside the exclusion region in the medical image. Here, a case in which a bone region is acquired as the exclusion region and the reference points are set outside the exclusion region is explained as an example.

Firstly, a known segmentation method, such as graph cut processing, is used to extract the bone region in the body from the medical image data. Of course, an approach for extracting the bone region is not limited to this, and configuration may be taken so that: the medical image data is displayed on the display unit 36; a user operates the operation unit 35, while watching the medical image data that is displayed, to manually select the bone region; and the selected bone region is thereby extracted.

Next, if a position (for example, a position separated by a fixed distance along a normal direction) of a reference point set in accordance with step S203 for each outline configuration point overlaps with the bone region, the reference point is set to a position further separated along the normal direction, so as to not overlap with the bone region. FIGS. 9A and 9B are used to explain details for this reference point setting method.

FIG. 9A shows a state in which a bone region 902 is included in the pixel group 304. The pixel positions of each pixel that configures the bone region 902 are (7,2,1), (8,2,1), (9,2,1), (7,3,1), (8,3,1), (9,3,1), (7,4,1), (8,4,1), (9,4,1). Explanation is given for a case in which in such a state, as the method of setting the reference points of the outline configuration points, a method of setting at positions for which a distance separated from the center of a line segment connecting two outline configuration points adjacent to the outline configuration point and along a normal direction is just two pixels is employed.

If such a reference point setting method is followed with, in step S203 the coordinates of a target-site side reference point become (2,5,1), and coordinates of a periphery side reference point become (6,1,1) for the position of a point a in FIGS. 9A and 9B. Next reference points for the position of a point b is considered. According to the above-described reference point setting method, the coordinate of the target-site side reference point become (3,6,1), and coordinates of the periphery side reference point become (7,2,1) for the position of a point b, but coordinates (7,2,1) are coordinates that are inside the bone region. In such a case, a position further separated by just one pixel along the normal direction is re-set as the position of the reference point. In other words, the periphery side reference point for the position of the point b is set at the coordinates (8,1,1). Here, if the position separated by just one pixel is once again in the exclusion region, setting is performed to a position further separated by one pixel. In this way, until the reference point is set at a position outside the exclusion region, the position set for the reference point is changed to a position separated along a normal direction. FIG. 9B shows target-site side reference points ai-fi and periphery side reference points ao-fo for positions of points a-f in FIGS. 9A and 9B.

According to processing of the present variation, if a reference point for an outline configuration point is set at a position separated by a fixed distance or more (for example, 50 pixels or more), it may not be possible to calculate a "slippage" that meets the intention of a user. Accordingly, if a reference point is set to a position that is separated by a predetermined fixed distance or more, configuration may be taken to not calculate a "slippage" for the outline configuration point corresponding to that reference point.

According to the present variation, because it is possible to avoid setting a reference point in a region of the target site in the medical image data in which anatomical characteristics are different, it is possible to obtain the movement amount in a state where conditions match better, for each outline configuration point.

(Fifth Variation)

For the first embodiment, in step S205 the reference points set in step S203 and the corresponding pixel position information acquired in step S204 are used to calculate the "slippage" for each the outline configuration point. However, for calculation of the "slippage", other information may be used. For example, in a normal state for the lungs, the caudal side thereof (close to the diaphragm) has a large movement amount in comparison to the cranial side thereof (close to the apex pulmonis), and in other words has a large "slippage". Accordingly, if the magnitude of the "slippage" is simply visualized, there is the possibility that recognition of a region having an abnormal "slippage" will become difficult. Accordingly, from temporal medical image data of many normal lungs, a model reflecting movement of a normal lung is generated, and the model may be used to obtain a correction coefficient for "slippage" of the caudal side region and of the cranial side region, and applied to the "slippage" of each outline configuration point. In other words, the slippage obtained for each position on the surface of the target site or for each position in the target site may be corrected by using a correction coefficient set for each position on the surface of the target site or of for each position in the target site. For example, for a region in which the "slippage" is large in a normal state (for example, the caudal side region), a correction coefficient that reduces the "slippage" is calculated, and for a region in which the "slippage" is small in a normal state (for example, the cranial side region), a correction coefficient that enlarges the "slippage" is calculated. Then the movement information calculating unit 45 uses the calculated correction coefficients to normalize (correct) the "slippage" for each outline configuration point (for example, the "slippage" is multiplied by the correction coefficient). Thereby, it is possible to calculate "slippage" that better matches the intention of a user. Note that in the present variation, the method of normalizing the "slippage" for each outline configuration point based on normal movement of the target site is just one example, and other methods may be used to achieve a similar objective. For example, normalizing may be performed by using medical image data temporally captured in the past for the same patient. At that time, it is possible to visualize a region in which a difference in "slippage" is large with respect to the past. Also, if a target site exists for which the left and the right thereof are symmetrical, such as with the lungs, the "slippage" of the symmetrical target site of the target site may be used to perform normalizing.

(Sixth Variation)

In the first embodiment, explanation was given for an example applied to medical image data captured by an X-ray CT apparatus, such as an X-ray 4D-CT image. However, modality is not limited to an X-ray CT apparatus, if it is possible to obtain medical image data that differs temporally (for a lung field, medical image data for which an inhalation amount differs).

For example, in the case of a simple X-ray photograph, medical image data for a state in which a breath is fully inhaled (inhalation image data), and medical image data for a state in which a breath is fully exhaled (exhalation image data) is captured under the same image capturing conditions (tube current, tube voltage, irradiation period, irradiation distance). Similar to a CT image, processing of step S202-step S206 may be performed with respect to these two pieces of medical image data. Note that in a case of the simple X-ray photograph, because it is a 2D image, it is predicted that a rib region is an impediment when a lung field region is extracted. In such a case, a conventional rib extraction method may be used to remove the rib region from the medical image data, and thereafter conventional segmentation processing may be used to extract the lung field.

In addition, even for medical image data captured by using an MRI apparatus, an ultrasonic apparatus or the like, it is possible to obtain medical image data for at least two temporally different points in time, and if the region of the target site can be extracted, it is possible to apply similar processing.

Second Embodiment

In the first embodiment, reference points are set on the target-site side and the periphery side across from each other over an outline for each outline configuration point of the target site, and the "slippage" is calculated based on corresponding pixel position information for each reference point. In the second embodiment, the outside (the periphery side) of the outline of the target site is fixed, and the "slippage" is calculated from the corresponding pixel position information of each reference point in the inside (the target-site side).

Although a configuration of the medical image processing apparatus 10 and a configuration of the medical image processing system according to the present embodiment are similar to that of the first embodiment, processing performed by the medical image processing apparatus 10 is changed from the processing in accordance with the flowchart of FIG. 2 as follows. Note that below, explanation is given with the target site as a lung, similarly to the first embodiment. The action of step S201-step S203 is similar to the processing in the first embodiment. In step S204, processing in accordance with the flowchart of FIG. 10 is performed.

<Step S1001>

The registration unit 44 performs the deformation registration processing after setting the density value for each of the reference image and the floating image to conditions (for example, WL as 60 and WW as 400) suitable to the display of the periphery side (a soft part region, such as muscle or the like). Here, an image generated by performing the deformation registration processing on the reference image with respect to the floating image under conditions suitable to display of the periphery side is referred to as a provisional image.

<Step S1002>

The registration unit 44 performs the deformation registration processing after setting the density value for each of the reference image and the provisional image to conditions (for example, WL as −600 and WW as 150) suitable to the display of the target site (organ side: the lung field region). Then the registration unit 44 calculates the pixel positions on the provisional image corresponding to respective pixels on the reference image (acquires the corresponding pixel position information). Here, the positions of periphery side reference points on the reference image and positions of corresponding points on the provisional image, which correspond to the reference points, should substantially match by the processing of step S1001. In other words, in a state in which the periphery side reference points for each outline configuration point are fixed, it is possible to acquire the corresponding pixel position information for the target-site side reference points through processing of step S1002. Here, it can be considered that the target-site side reference points for respective outline configuration points corresponding to position having adhesion also substantially match by the processing of step S1001, similar to the periphery side reference points. This is because even in the target-site side region, it can be considered that a region that is firmly joined, such as by adhesion, to the periphery side will track movement of the periphery side. Accordingly, the "slippage" of the target-site side reference points for respective outline configuration points corresponding to positions at which there is adhesion becomes smaller in comparison to a position at which there is no adhesion.

In step S205, the movement information calculating unit 45 uses the target-site side reference points from the reference points set in step S203, and the corresponding pixel position information for the target-site side reference points, from the corresponding pixel position information acquired in step S204, to calculate the "slippage" for each outline configuration point. In other words, the corresponding pixel position information for the periphery side reference points is not used. More specifically, coordinates for a target-site side reference point in the reference image at an outline configuration point P are set as $(x_i, y_i, z_i)$, and coordinates for a pixel on the provisional image corresponding to the reference point are set as $(x_i', y_i', z_i')$. At this time, the "slippage" S2 of that outline configuration point can be obtained by calculating the following equation.

$$S2=\sqrt{((x_i-x_i')^2+(y_i-y_i')^2+(z_i-z_i')^2)}$$

The processing in step S206 is similar to that of the first embodiment. In this way, according to the present embodiment, it is possible to visualize differences in "slippage" for surface positions of the target site. Accordingly, a user can recognize a region having "slippage" that is different to the periphery of the target site, and can recognize the presence/absence of an abnormality of the target site, the position of an abnormal location, or the like. Note that the above-explained embodiments and variations may be implemented by appropriately combining all or parts thereof.

In this way, each of the first and second embodiments and the first-sixth variations is merely an example of a medical image processing apparatus comprising: an acquisition unit that acquires medical image data for of differing time phases, an extraction unit that extracts a target site with respect to at least one piece of the medical image data acquired in accordance with the acquisition unit, a setting unit for respectively setting a reference point on an outline of the target site extracted by the extraction unit, and setting a reference point on either a target-site side or a periphery side of the target site, making the outline a reference, and a movement information calculating unit that calculates movement information for the reference point set by the setting unit, and further variations can be considered if they have a configuration that resolves to a similar configuration.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a divisional of U.S. patent application Ser. No. 16/588,015 filed Sep. 30, 2019 which is a continuation of U.S. patent application Ser. No. 15/514,140 filed Mar. 24, 2017, which is a national phase of PCT Application No. PCT/JP2015/004581 filed Sep. 9, 2015, which claims the benefit of Japanese Patent Application No. 2014-203344, filed Oct. 1, 2014, which are hereby incorporated by reference herein in their entirety.

The invention claimed is:

1. A medical image processing apparatus comprising:
   an acquisition unit configured to acquire a plurality of medical images obtained by capturing a target site at times different to each other;
   a registration unit configured to perform registration process on a periphery side of the target site between the plurality of medical images that are set to a first condition, and perform registration process on a target-site side of the target site between the plurality of medical images that are set to a second condition different from the first condition; and
   a calculation unit configured to calculate, based on a result of the registration process on the periphery side of the target site and a result of the registration process on the target-site side of the target site, slippage on each of a plurality of points being on an outline of the target site.

2. The apparatus according to claim 1, wherein the first condition is a condition in which image features of the periphery side of the target site are emphasized, and the second condition is a condition in which image features of the target-site side of the target site are emphasized.

3. The apparatus according to claim 1, wherein the calculation unit calculates, as the slippage, difference between the result of the registration process on the periphery side of the target site and the result of the registration process on the target-site side of the target site.

4. A medical image processing method comprising:
   acquiring a plurality of medical images obtained by capturing a target site at times different to each other;
   performing registration process on a periphery side of the target site between the plurality of medical images that are set to a first condition;
   performing registration process on a target-site side of the target site between the plurality of medical images that are set to a second condition different from the first condition; and
   calculating, based on a result of the registration process on the periphery side of the target site and a result of the registration process on the target-site side of the target site, slippage on each of a plurality of points being on an outline of the target site.

* * * * *